United States Patent
Tomlin

(10) Patent No.: US 10,241,908 B2
(45) Date of Patent: Mar. 26, 2019

(54) TECHNIQUES FOR DYNAMICALLY DETERMINING ALLOCATIONS AND PROVIDING VARIABLE OVER-PROVISIONING FOR NON-VOLATILE STORAGE

(75) Inventor: Andrew John Tomlin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/112,221

(22) PCT Filed: Apr. 22, 2012

(86) PCT No.: PCT/US2012/034601
§ 371 (c)(1),
(2), (4) Date: Nov. 11, 2013

(87) PCT Pub. No.: WO2012/148828
PCT Pub. Date: Nov. 1, 2012

(65) Prior Publication Data
US 2014/0101379 A1    Apr. 10, 2014

Related U.S. Application Data

(60) Provisional application No. 61/479,249, filed on Apr. 26, 2011.

(51) Int. Cl.
*G06F 12/02* (2006.01)
*G06F 3/06* (2006.01)

(52) U.S. Cl.
CPC ........ *G06F 12/0246* (2013.01); *G06F 3/0608* (2013.01); *G06F 3/0631* (2013.01);
(Continued)

(58) Field of Classification Search
CPC .. G06F 12/02; G06F 12/0223; G06F 12/0253; G06F 12/0284; G06F 2212/1032;
(Continued)

(56) References Cited

U.S. PATENT DOCUMENTS

| | | | |
|---|---|---|---|
| 5,737,742 A | 4/1998 | Achiwa et al. | |
| 6,898,662 B2 | 5/2005 | Gorobets | |

(Continued)

FOREIGN PATENT DOCUMENTS

| | | |
|---|---|---|
| JP | H07-160602 A | 6/1995 |
| JP | 2007-226557 A | 9/2007 |
| WO | WO9217844 | 10/1992 |

OTHER PUBLICATIONS

Agrawal et al, "Design Tradeoffs for SSD Performance," Proceedings of the 2008 USENIX Annual Technical Conference, Jun. 2008, 14 pages.*

(Continued)

*Primary Examiner* — Glenn Gossage
(74) *Attorney, Agent, or Firm* — Cesari & Reed, LLP; Kirk A. Cesari

(57) ABSTRACT

Dynamically varying Over-Provisioning (OP) enables improvements in lifetime, reliability, and/or performance of a Solid-State Disk (SSD) and/or a flash memory therein. A host coupled to the SSD writes newer data to the SSD. If the newer host data is less random than older host data, then entropy of host data on the SSD decreases. In response, an SSD controller dynamically alters allocations of the flash memory, decreasing host allocation and increasing OP allocation. If the newer host data is more random, then the SSD controller dynamically increases the host allocation and decreases the OP allocation. The SSD controller dynamically allocates the OP allocation between host OP and system OP proportionally in accordance with a ratio of bandwidths of host and system data writes to the flash (Continued)

memory. Changes in allocations are selectively made in response to improved compression or deduplication of the host data, or in response to a host command.

18 Claims, 7 Drawing Sheets

(52) U.S. Cl.
CPC .... *G06F 3/0679* (2013.01); *G06F 2212/1016* (2013.01); *G06F 2212/1032* (2013.01); *G06F 2212/1036* (2013.01); *G06F 2212/214* (2013.01); *G06F 2212/7202* (2013.01); *G06F 2212/7204* (2013.01); *G06F 2212/7206* (2013.01)

(58) Field of Classification Search
CPC ....... G06F 2212/214; G06F 2212/2022; G06F 2212/7202; G06F 2212/7204; G06F 2212/7206; G06F 3/0631; G06F 3/0608; G06F 2212/1016; G06F 2212/1036
See application file for complete search history.

(56) References Cited

U.S. PATENT DOCUMENTS

| | | | |
|---|---|---|---|
| 7,224,607 | B2 | 5/2007 | Gonzalez et al. |
| 7,467,278 | B2 | 12/2008 | Creamer et al. |
| 7,509,471 | B2 | 3/2009 | Gorobets |
| 7,702,845 | B2 | 4/2010 | Shin et al. |
| 7,849,275 | B2 | 12/2010 | Danilak |
| 7,908,423 | B2 | 3/2011 | Hsu et al. |
| 7,949,637 | B1 | 5/2011 | Burke |
| 8,055,836 | B2 | 11/2011 | Kim et al. |
| 8,065,469 | B2 | 11/2011 | Mothilal |
| 8,065,470 | B2 | 11/2011 | Yano et al. |
| 8,074,011 | B2 | 12/2011 | Flynn et al. |
| 8,078,794 | B2 | 12/2011 | Lee et al. |
| 8,214,580 | B2 | 7/2012 | Lucas et al. |
| 8,275,933 | B2 | 9/2012 | Flynn et al. |
| 8,285,918 | B2 | 10/2012 | Maheshwari |
| 8,327,226 | B2 * | 12/2012 | Rub .............................. 714/763 |
| 8,339,881 | B2 | 12/2012 | Danilak |
| 8,380,945 | B2 | 2/2013 | Ye et al. |
| 8,438,361 | B2 | 5/2013 | Goss et al. |
| 8,447,918 | B2 | 5/2013 | Sprinkle et al. |
| 8,458,417 | B2 | 6/2013 | Goss et al. |
| 8,463,984 | B2 | 6/2013 | Olds et al. |
| 8,479,080 | B1 * | 7/2013 | Shalvi et al. ................. 714/774 |
| 8,621,138 | B2 | 12/2013 | Olbrich et al. |
| 8,677,054 | B1 * | 3/2014 | Meir et al. .................... 711/103 |
| 8,719,501 | B2 | 5/2014 | Flynn et al. |
| 8,918,620 | B2 | 12/2014 | Matsumura et al. |
| 2004/0250026 | A1 | 12/2004 | Tanoue |
| 2007/0156998 | A1 | 7/2007 | Gorobets |
| 2007/0198799 | A1 | 8/2007 | Shinohara et al. |
| 2009/0049234 | A1 | 2/2009 | Oh et al. |
| 2009/0125700 | A1 | 5/2009 | Kisel |
| 2009/0182791 | A1 | 7/2009 | Gorobets |
| 2009/0249022 | A1 | 10/2009 | Rowe et al. |
| 2010/0174860 | A1 | 7/2010 | Kim |
| 2011/0099320 | A1 * | 4/2011 | Lucas et al. .................. 711/103 |
| 2011/0153911 | A1 | 6/2011 | Sprouse et al. |
| 2011/0246701 | A1 | 10/2011 | Kano et al. |
| 2011/0264843 | A1 * | 10/2011 | Haines et al. ................ 711/103 |
| 2012/0023144 | A1 | 1/2012 | Rub |
| 2012/0059976 | A1 * | 3/2012 | Rosenband et al. .......... 711/103 |
| 2013/0275672 | A1 * | 10/2013 | Bert ............................. 711/114 |

OTHER PUBLICATIONS

Mehling, Herman, "Solid State Drives Get Faster with TRIM," Jan. 27, 2010 (retrieved from http://www.enterprisestorageforum.com/technology/features/article.php/3861181/Solid-State-Drives-Get-Faster-with-TRIM.htm and converted to pdf format Apr. 7, 2014), 4 pages.*

Layton, Jeffrey, "Anatomy of SSDs," Linux Magazine, Oct. 27, 2009 (Retrieved from http://www.linux-mag.com/id/7590/2 and converted to pdf format Apr. 7, 2014), 4 pages.*

Shimpi, Anand Lal, "The Impact of Spare Area on SandForce, More Capacity At No Performance Loss?" May 3, 2010 (retrieved from http://www.anandtech.com/show/3690/the-impact-of-spare-area-on-sandforce-more-capacity-at-no-performance-loss and converted to pdf format Apr. 7, 2014), 14 pages.*

Frankie et al, "SSD Trim Commands Considerably Improve Overprovisioning," Proceedings Flash Memory Summit 2011, Aug. 2011, 19 pages.*

Smith, Kent, "Garbage Collection: Understanding Foreground vs. Background GC and Other Related Elements," Proceedings Flash Memory Summit 2011, Aug. 2011, 9 pages.*

Smith, Kent, "Understanding SSD Over Provisioning," Proceedings Flash Memory Summit 2012, Aug. 2012, 16 pages.*

"SSDs-Write Amplification, Trim and GC," Mar. 2010 (retrieved from http://www.oczenterprise.com/whitepapers/ssds-write-amplification-trim-and-gc.pdf , using Internet Archive Wayback Machine Mar. 28, 2014), 3 pages.*

"Write Amplification," Wikipedia (retrieved from http://en.wikipedia.org/wiki/Write_amplification and converted to pdf format Apr. 7, 2014), 14 pages.*

"Workload" dictionary definition, downloaded from https://www.merriam-webster.com/dictionary/workload , reprinted Apr. 23, 2018, 1 page.*

"Bandwidth" defintion, downloaded from WhatIs.com, http://searchenterprisewan.techtarget.com/definition/bandwidth , reprinted Apr. 23, 2018, 1 page.*

International Search Report in the parent PCT/US2012/034601, 3 pages, completed Nov. 29, 2012.

Written Opinion in the parent PCT/US2012/034601, 4 pages, completed Nov. 29, 2012.

Moulton, "NetApp Data Compression and Deduplication— Deployment and Inplementation Guide: Data ONTAP 8.1 Operating in Cluster-Mode", Mar. 31, 2011, pp. 1-84, US.

European Search Report, PCT/US2012/034601, dated Jan. 23, 2015, 7 pages.

Evaluating Subject Matter Eligibility Under 35 USC 101, Aug. 2012 Update, pp. 1-73, http://www.uspto.gov/patents/law/exam/101_training_aug_aug2012.pdf.

Byun, "An Index Management using CHC-cluster for Flash Memory Databases", Online publication Dec. 2008, The Journal of Systems and Software 82, ScienceDirect, pp. 825-835.

Hsieh et al. "Efficient Identification of Hot Data for Flash-Memory Storage Systems," Department of Computer Science and Information Engineering, National Taiwan University, Taipai, Taiwan 106, R.O.C., Feb. 2006, 19 pp.

Chiang et al., "Managing Flash Memory in Personal Communication Devices", Consumer Electronics, 1997. ISCE '97., Proceedings of 1997 IEEE International Symposium on Singapore Dec. 2-4, 1997, New York, NY, USA, IEEE, US, Dec. 2, 1997, pp. 177-182.

International Preliminary Report on Patentability dated Oct. 23, 2012 from PCT Application No. PCT/US2011/033208, 6 pages.

Chang et al., "Efficient Management for Large-Scale Flash-Memory Storage Systems with Resource Conservation," Term paper from National Chiao-Tung University, Hsin-Chu, Taiwan, published on May 13, 2009, 37 pages.

Rayankula et al. "A Block-Clustering based approach to inplement wear leveling in SSD," Project report for University of Minnesota CSci 8980; Advanced Storage Systems, published on May 13, 2009, 22 pages.

Jung et al., "Cache over Solid State Disk through DiskSIM," Term Project Final report from University of Minnesota CSci 8980; Advanced Storage Systems, published on May 13, 2009, 29 pages.

Narang et al. "Integrated Caching and Wear Leveling Algorithm," Term paper, Department of Computer Science, University of Minnesota, published on May 13, 2009, 7 pages.

(56) References Cited

OTHER PUBLICATIONS

Mohammed et al., "Improving Hot Data Identification for Hybrid SLC/MLC Device," Term Project from University of Minnesota CSci 8980; Advanced Storage Systems, published on May 13, 2009, 9 pages.

\* cited by examiner

TECHNIQUES FOR DYNAMICALLY DETERMINING ALLOCATIONS AND PROVIDING VARIABLE OVER-PROVISIONING FOR NON-VOLATILE STORAGE

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application 61/479,249, filed Apr. 26, 2011, first named inventor Andrew John Tomlin, and entitled Variable Over-Provisioning for Non-Volatile Storage.

BACKGROUND

Field

Advancements in non-volatile storage technology are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

Figure 1A:
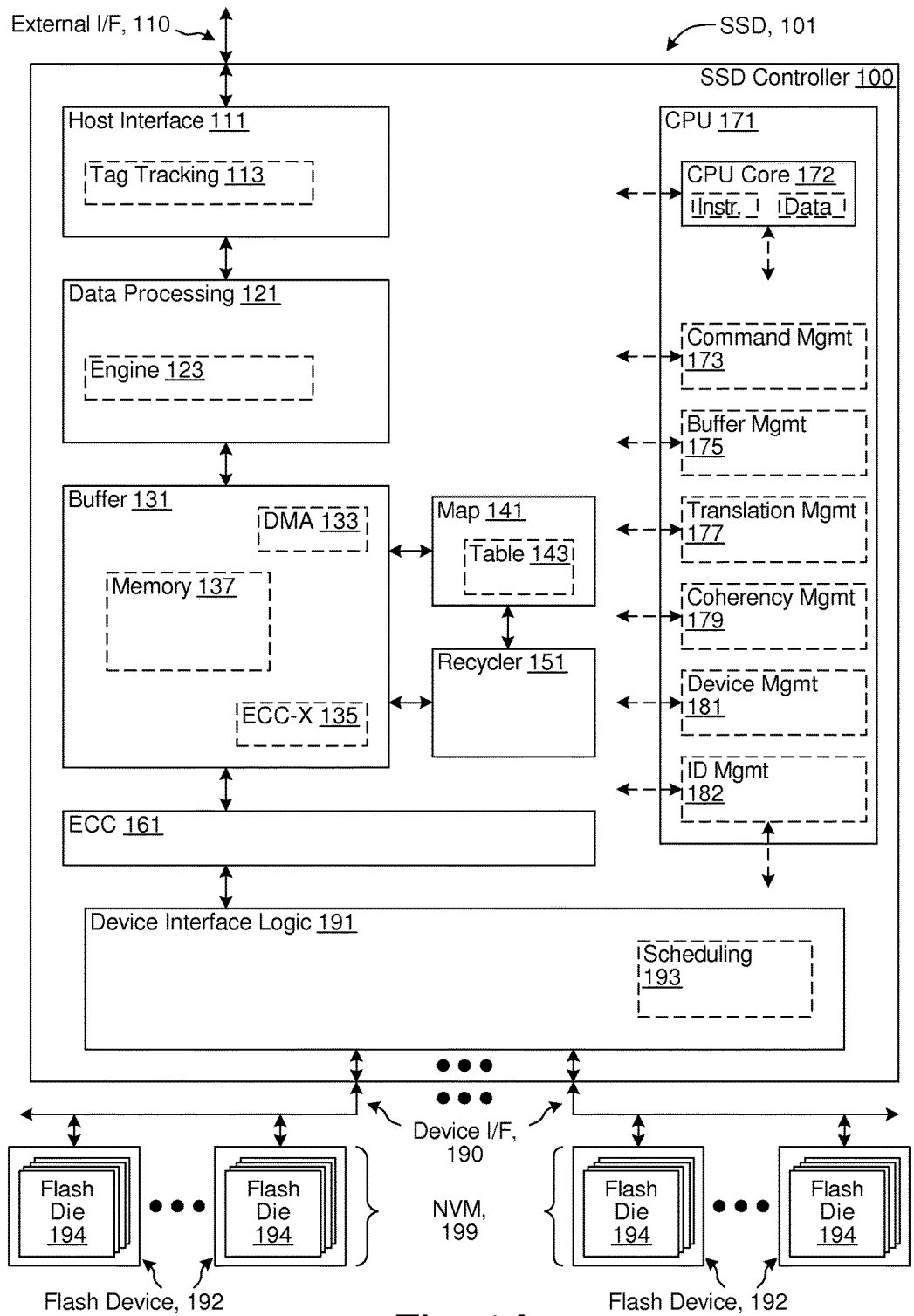
FIG. 1A illustrates selected details of an embodiment of a Solid-State Disk (SSD) including an SSD controller using variable Over-Provisioning (OP) for managing non-volatile storage, such as implemented via Non-Volatile Memory (NVM) elements (e.g. flash memories).

| Ref. Symbol | Element Name |
| --- | --- |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |

-continued

| Ref. Symbol | Element Name |
|---|---|
| 191 | Device Interface Logic |
| 192 | Flash Device |
| 193 | Scheduling |
| 194 | Flash Die |
| 199 | NVM |
| 200 | Flash Memory |
| 201 | System Allocation |
| 202A | Host Allocation |
| 202C | Host Allocation |
| 203A | OP Allocation |
| 203C | OP Allocation |
| 204A | System OP Allocation |
| 204B | System OP Allocation |
| 204C | System OP Allocation |
| 205A | Host OP Allocation |
| 205B | Host OP Allocation |
| 208 | System OP Allocation Delta |
| 209 | System OP Allocation Delta |
| 210A | Initial Allocation |
| 210B | Same Allocation |
| 210C | Increased Allocation |
| 301 | System Allocation |
| 301F | System Allocation (fixed) |
| 302G1 | Host Allocation |
| 302G2 | Host Allocation |
| 302H1 | Host Allocation |
| 302H2 | Host Allocation |
| 302V | Host Allocation |
| 303G1 | (combined) OP Allocation |
| 303G2 | (combined) OP Allocation |
| 303H1 | (combined) OP Allocation |
| 303H2 | (combined) OP Allocation |
| 303V1 | System OP Allocation (var) |
| 303V2 | System OP Allocation (var) |
| 304F | System OP Allocation (fixed) |
| 304G1 | System OP Allocation |
| 304G2 | System OP Allocation |
| 304H1 | System OP Allocation |
| 304H2 | System OP Allocation |
| 305G1 | Host OP Allocation |
| 305G2 | Host OP Allocation |
| 305H1 | Host OP Allocation |
| 305H2 | Host OP Allocation |
| 310 | Physical Size |
| 320 | Data Entropy |
| 330G | G % |
| 330H | H % |
| 400 | Flow Diagram |
| 401 | Determine If (Re)Allocation Conditions Exist |
| 402 | (Re)Allocate? |
| 403 | Perform (Re)Allocation |
| 500 | Flow Diagram |
| 501 | Free |
| 502 | Free Queue |
| 503 | Host Unit |
| 504 | System Unit |
| 512 | Queue Allocation |
| 513 | Host Allocation |
| 514 | System Allocation |
| 515 | Recycle Host Unit |
| 516 | Recycle System Unit |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| BCH | Bose Chaudhuri Hocquenghem |
| ATA | Advanced Technology Attachment (AT Attachment) |
| CD | Compact Disk |
| CF | Compact Flash |
| CPU | Central Processing Unit |
| CRC | Cyclic Redundancy Check |
| DAS | Direct Attached Storage |
| DDR | Double-Data-Rate |
| DES | Data Encryption Standard |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| I/O | Input/Output |
| IC | Integrated Circuit |
| IDE | Integrated Drive Electronics |
| LAN | Local Area Network |
| LB | Logical Block |
| LBA | Logical Block Address |
| LDPC | Low-Density Parity-Check |
| LPN | Logical Page Number |
| MLC | Multi-Level Cell |

-continued

| Acronym | Description |
| --- | --- |
| MMC | MultiMediaCard |
| NAS | Network Attached Storage |
| NCQ | Native Command Queuing |
| NVM | Non-Volatile Memory |
| ONA | Optimized NAND Access |
| ONFI | Open NAND Flash Interface |
| OP | Over-Provisioning |
| OS | Operating System |
| PC | Personal Computer |
| PCIe | Peripheral Component Interconnect express (PCI express) |
| PDA | Personal Digital Assistant |
| POS | Point Of Sale |
| RAID | Redundant Array of Inexpensive/Independent Disks |
| ReRAM | Resistive Random Access Memory |
| RS | Reed-Solomon |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SSD | Solid-State Disk/Drive |
| UFS | Unified Flash Storage |
| USB | Universal Serial Bus |
| VF | Virtual Function |
| WAN | Wide Area Network |

Conceptually, an SSD controller providing variable OP for NVM, such as used for non-volatile storage of SSD data, enables longer lifetimes, enhanced reliability, and/or improved performance, in various circumstances. Conceptually, the NVM is dynamically allocated between storing host data, storing system data, and OP use, and the OP use allocation is dynamically allocated between host data OP and system data OP. The allocations are dynamically variable based on various operating characteristics and/or contexts of the SSD, the SSD controller, and/or the NVM.

A host coupled to the SSD writes newer data to the SSD. If the newer host data is less random than older host data (and thus more effectively compressible), then entropy of the host data is decreasing. In response, an SSD controller of the SSD dynamically alters allocations of the NVM (e.g. flash memory), decreasing host allocation while increasing OP allocation, and dynamically allocates the OP allocation between system OP and host OP proportionally in accordance with a ratio of bandwidths of system and host data writes to the NVM. If the newer host data is more random (and thus less effectively compressible), then the host allocation is increased, the OP allocation is decreased, and allocated between the system data OP and the host data OP in accordance with the ratio.

For instance, as "free space" of the NVM increases/decreases (e.g. due to reduced/increased host or system data storage space), the OP use allocation is increased/decreased (optionally after a delay to accommodate garbage collection, recycling, and/or erasure). For another instance, the OP use allocation between system data OP and host data OP is proportional to a dynamically varying value, the dynamically varying value being a bandwidth of system data writes to the NVM divided by a bandwidth of host data writes to the NVM. The host data storage space varies at least according to varying entropy of the host data (e.g. compressibility and/or responsiveness to size reduction via de-duplication) and host commands that explicitly de-allocate previously allocated host data storage space.

For a first example, if the NVM available for OP decreases (increases), by an amount, then the system data OP and the host data OP are collectively decreased (increased) by the amount while maintaining a same ratio between the system data OP and the host data OP. For a second example, if a ratio of a system data rate to a host data rate changes, then the system data OP and the host data OP are adjusted according to the change in the ratio. An instance of a system data rate is a bandwidth of system data writes to NVM, and an instance of a host data rate is a bandwidth of host data writes (e.g. writes that are not system data writes) to NVM, such that the system data writes correspond to all NVM writes except NVM writes that are writing host data. The writing of host data optionally and/or selectively includes writing headers usable to identify the host data and/or ECC information corresponding to the host data. As a third example, system data OP and host data OP are allocated in accordance with respective data rates (e.g. linearly in accordance with a ratio of the data rates), such as when a unit of NVM is allocated, or when a garbage collection (e.g. to reclaim partially used NVM units) is performed.

For a fourth example, the first and the second (or third) examples are combined, such that a change in NVM available for OP and a change in a system to host data rate ratio result in corresponding changes to system data OP and host data OP allocations. Additional examples include any of the aforementioned examples where the system data OP and/or the host data OP are reallocated dynamically based on an event, such as an event associated with allocation of a unit of the NVM, garbage collection of a portion of the NVM, or any other event where a unit of the NVM is available for reallocation from one type of use (e.g. host data) to another type of use (e.g. system data).

In some embodiments, allocation of OP resources between system and host usages is subject to respective minimum/maximum values and/or granularities. For example, system and/or host OP allocation is a minimum of a predetermined number of units, independent of host allocation and/or ratio of system data rate to host data rate. For another example, system and/or host OP allocation is granular in accordance with a predetermined number of units.

In various embodiments, NVM (e.g. flash memory) is managed in portions, referred to as (managed) units of (flash memory), and also referred to herein as 'managed units' or 'units'. Examples of (managed) units of (flash memory) are one or more contiguous and/or non-contiguous portions of the flash memory, such as one or more contiguous/non-contiguous pages/blocks of the flash memory, one or more R-blocks (described elsewhere herein) of the flash memory, or any sub-portion of the flash memory suitable for management operations (such as allocation). In some embodiments, allocation of flash memory is granular in accordance with integer quanta of flash memory management units.

An example of an R-block is a logical slice or section across all die of a flash memory. For example, in a flash memory having R flash die, each flash die having N blocks, each R-block is the $i^{th}$ block from each of the flash die taken together, for a total of N R-blocks. For another example, in a flash memory having R flash die, each with N blocks, each R-block is the $i^{th}$ and $(i+1)^{th}$ block from each of the flash die, for a total of N/2 R-blocks. For yet another example, in a flash memory having a plurality of dual plane devices, each R-block is the $i^{th}$ even block and the $i^{th}$ odd block from each of the dual plane devices.

In some situations, write amplification results when a host storage write of a particular size results in a plurality of writes (each having a size of, e.g., a multiple of the particular size) to flash memory of an SSD. The plurality of writes arises from, for example, erasing a portion of flash memory before writing (e.g. programming) the portion, wear leveling, garbage collection, and flash memory management operations that result in system data writes. An example calculation of write amplification is an amount of data written to flash memory on behalf of a particular collection of host writes (including, e.g., system writes to complete writing of host data associated with the host writes), divided by an amount of data written by the particular collection of host writes.

In some embodiments and/or usage scenarios, write amplification is relatively low, such as a relatively long sequence of host writes to sequential addresses when garbage collection and/or other operations have made a relatively large portion of flash memory erased and readily available for writing (e.g. programming). In some embodiments and/or usage scenarios, write amplification is relatively high, such as a relatively long sequence of host writes to random addresses when a relatively small portion of flash memory is erased and readily available for writing.

Via a controller for an SSD, flash memory of the SSD is allocated between storage of host data and system data. The host data is associated with a host coupled to the SSD and the system data is associated with the controller. The controller dynamically controls the allocation according to overall free space of the flash memory. In some embodiments and/or usage scenarios, increasing OP of the system data via increasing the allocation to the system data (and decreasing the allocation to the host data) enables reduced write amplification and improved SSD and/or flash memory performance, reliability, and/or lifetime. The overall free space of the flash memory is the free space of the host data allocation and the free space of the system data allocation.

The dynamic allocation control is used in various embodiments, for instance where the host data includes logical units of various sizes, such as when the host data is compressed, deduplicated, or transformed in some manner resulting in logical units of various sizes. The dynamic allocation control is used in various embodiments, for instance where the host data is relatively highly reducible, such as when the host data is relatively highly compressible or relatively highly compactable via deduplication.

The host data includes data received from (or provided to) one or more hosts (e.g. computing hosts), or data derived from the data from (or to) the hosts (e.g. via compression, deduplication, encryption, or any reversible transformation). Examples of host data include user data and/or files, application data and/or files, driver data and/or files, OS data, data structures, and/or files, and other information provided by the host via an interface between the SSD and the host. The host data as written to NVM optionally and/or selectively includes metadata added by the SSD controller and written with the host data, such as headers used to identify the host data and/or ECC information corresponding to the host data. The system data includes data relating to management or operation of the controller, the SSD, and/or the flash memory, or any portions thereof. Examples of system data include LBA to flash memory block mapping information and checkpoint information to enable restoration of correct state in an event of a malfunction (e.g. a crash or a power failure). Other examples of system data include information not specific to host data but useful in managing storage thereof via an SSD, SSD controller, and/or NVM (e.g. flash memory), or managing operation of an SSD, SSD controller, and/or NVM.

In various situations, a ratio of host data space used to system data space used is a ratio of 100:1 to 500:1. In various situations, such as situations with a relatively high number of random writes, a ratio of system data write bandwidth to host data write bandwidth is a ratio of 2:1 to 5:1.

Elsewhere herein, bandwidth of host data writes to flash memory is sometimes referred to as bandwidth of host data writes or alternatively as host write bandwidth and bandwidth of system data writes to flash memory is sometimes referred to as bandwidth of system data writes or alternatively as system write bandwidth.

In some embodiments, accessing compressed data of varying-sized quanta in NVM provides improved storage efficiency in some usage scenarios. For example, an SSD controller receives data (that is not compressed) from a computing host (e.g., relating to a disk write command), compresses the data, and stores the compressed data into flash memory. In response to a subsequent request from the computing host (e.g., relating to a disk read command), the SSD controller reads the compressed data from the flash memory, decompresses the compressed data, and provides the decompressed data to the computing host. The compressed data is stored in the flash memory according to varying-sized quanta, the quanta size varying due to, e.g., compression algorithm, operating mode, and compression effectiveness on various data. The SSD controller decompresses the data in part by consulting an included map table to determine where header(s) are stored in the flash memory. The SSD controller parses the header(s) obtained from the flash memory to determine where appropriate (compressed) data is stored in the flash memory. The SSD controller decompresses the appropriate data from the flash memory to produce the decompressed data to provide to the computing host.

In various embodiments, an SSD controller includes a host interface for interfacing with a computing host, an interface for interfacing with NVM such as flash memory, and circuitry for controlling the interfaces and performing (and/or controlling various aspects of the performing) compressing and decompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an eMMC interface standard, a THUNDERBOLT interface standard, a UFS interface standard, an SD interface standard, a MEMORY STICK interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as an SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as hard disk drives (HDDs), CD drives, and DVD drives. In various embodiments, SSDs use various combinations of zero or more parity codes, zero or more RS codes, zero or more BCH codes, zero or more Viterbi or other trellis codes, and zero or more LDPC codes.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A system comprising:
a means for operating all or any portions of one or more flash memories as respective allocations dedicated respectively to host data, system data, system over-provisioning (OP), and host OP; and
a means for dynamically determining any one or more of the respective allocations in response to one or more events.

EC2) The system of EC1, wherein the events comprise a change in amount of usage of any one or more of the respective allocations.

EC3) The system of EC1, wherein the events comprise a determination of altered effectiveness of any one or more of compression, deduplication, and transformation of information stored in the flash memories.

EC4) The system of EC3, wherein the altered effectiveness is measured at least in part by a particular amount of space used in a particular one of the respective allocations.

EC5) The system of EC3, wherein the altered effectiveness is measured at least in part by a particular amount of free space available in a particular one of the respective allocations.

EC6) The system of EC1, wherein the events comprise a determination of increased effectiveness of any one or more of compression and deduplication of information stored in the host data allocation.

EC7) The system of EC6, wherein the increased effectiveness is measured at least in part by a reduction in amount of space used in the host data allocation.

EC8) The system of EC6, wherein the increased effectiveness is measured at least in part by an increase in amount of free space available in the host data allocation.

EC9) The system of EC6, wherein the means for dynamically determining dynamically reduces any one or more of the host data allocation and the host OP allocation in response to the determination of increased effectiveness.

EC10) The system of EC6, wherein the means for dynamically determining dynamically increases any one or more of the system data allocation and the system OP allocation in response to the determination of increased effectiveness.

EC11) The system of EC1, wherein the means for operating and the means for dynamically determining are comprised in a controller of a Solid-State Disk (SSD) and the flash memories are comprised in the SSD.

EC12) A method comprising:
operating one or more flash memories of a Solid-State Disk (SSD) as respective host data, system data, and combined Over-Provisioning (OP) allocations;
operating the combined OP allocation as respective system and host OP allocations; dynamically determining a new value of the system OP allocation as a linear function of a ratio of a system data rate to a host data rate;
dynamically altering the system OP allocation in response to changes in the new value; and wherein the dynamically determining is in response to an event.

EC13) The method of EC12, further comprising.
receiving data from a host coupled to the SSD;
determining information from the data received from the host;
storing the information into the flash memories in accordance with the host data allocation.

EC14) The method of EC13, further comprising computing the information via compressing the data received from the host.

EC15) The method of EC13, further comprising computing the information via deduplicating the data received from the host.

EC16) The method of EC12, further comprising storing host address to flash memory address correspondence information into the flash memories in accordance with the system data allocation.

EC17) The method of EC12, wherein the event is based at least in part on selecting a unit of the flash memories for reclamation.

EC18) The method of EC17, wherein the reclamation comprises one or more of
garbage collection,
selection for garbage collection,
recycling,
selection for recycling,
erasure, and
selection for erasure.

EC19) A system comprising:
a means for operating one or more flash memories as respective host data, system data, and combined over-provisioning (OP) allocations;

a means for operating the combined OP allocation as respective system and host OP allocations; and a means for dynamically determining a new value of the system OP allocation in response to one or more events.

EC20) The system of EC19, further comprising a means for dynamically altering the system OP allocation in response to changes in the new value.

EC21) The system of EC19, wherein the means for dynamically determining the new value determines the new value in accordance with a function of a system data rate and a host data rate.

EC22) The system of EC21, wherein the means for dynamically determining the new value determines the new value in accordance with a ratio of the system data rate to the host data rate.

EC23) The system of EC22, wherein the means for dynamically determining the new value determines the new value as being proportional to the system data rate divided by the host data rate.

EC24) The system of EC21, wherein all of the means are comprised in a controller of a Solid-State Disk (SSD) and the flash memories are comprised in the SSD.

EC25) The system of EC24, further comprising a means for interfacing to a host and wherein the means for interfacing to the host is comprised in the SSD and the host data allocation is used at least in part to store information representing at least a portion of data communicated via the means for interfacing to the host.

EC26) The system of EC25, further comprising a means for determining at least a portion of the information via compression of at least a portion of the data communicated.

EC27) The system of EC25, further comprising a means for determining at least a portion of the information via deduplication of at least a portion of the data communicated.

EC28) The system of EC25, further comprising a means for determining at least a portion of the information via a reversible transformation that decreases entropy of at least a portion of the data communicated.

EC29) The system of EC24, wherein the system data allocation is used at least in part by the controller to store at least a portion of map data.

EC30) The system of EC24, wherein the system data allocation is used at least in part by the controller to store at least a portion of checkpoint data.

EC31) The system of EC21, wherein the system data rate is based at least in part on one or more of
  a rate of system data provided from a Solid-State-Disk (SSD) controller to store in the flash memories,
  a rate of system data written to the flash memories, and
  a bandwidth of system data writes to the flash memories.

EC32) The system of EC21, wherein the host data rate is based at least in part on one or more of
  a rate of data provided from a host to store in the flash memories,
  a rate of host data written to the flash memories, and
  a bandwidth of host data writes to the flash memories.

EC33) The system of EC19, wherein the events comprise initiating, completing, requesting, and/or selecting for one or more of
  allocation of a unit of the flash memories,
  garbage collection of one or more portions of the flash memories,
  recycling of one or more portions of the flash memories, and
  erasure of one or more portions of the flash memories.

EC34) The system of EC19, further comprising a means for communicating at least a portion of host data represented by information stored in at least a part of the host data allocation at least in part in response to requests from a computing host.

EC35) The system of EC34, further comprising a means for interfacing the requests with the computing host.

EC36) The system of EC35, wherein the means for interfacing the requests with the computing host is compatible with a storage interface standard.

EC37) The system of EC36, wherein the storage interface standard comprises one or more of
  a Universal Serial Bus (USB) interface standard,
  a Compact Flash (CF) interface standard,
  a MultiMediaCard (MMC) interface standard,
  an embedded MMC (eMMC) interface standard,
  a THUNDERBOLT interface standard,
  a UFS interface standard,
  a Secure Digital (SD) interface standard,
  a MEMORY STICK interface standard,
  an xD-picture card interface standard,
  an Integrated Drive Electronics (IDE) interface standard,
  a Serial Advanced Technology Attachment (SATA) interface standard,
  an external SATA (eSATA) interface standard,
  a Small Computer System Interface (SCSI) interface standard,
  a Serial Attached Small Computer System Interface (SAS) interface standard,
  a Fibre Channel interface standard,
  an Ethernet interface standard, and
  a Peripheral Component Interconnect express (PCIe) interface standard.

EC38) The system of EC34, further comprising all or any portions of the computing host.

EC39) The system of EC38, wherein the computing host comprises one or more of
  a computer,
  a workstation computer,
  a server computer,
  a storage server,
  a Storage Attached Network (SAN),
  a Network Attached Storage (NAS) device,
  a Direct Attached Storage (DAS) device,
  a storage appliance,
  a Personal Computer (PC),
  a laptop computer,
  a notebook computer,
  a netbook computer,
  a tablet device or computer,
  an ultrabook computer,
  an electronic reading device (an e-reader),
  a Personal Digital Assistant (PDA),
  a navigation system,
  a (handheld) Global Positioning System (GPS) device,
  an automotive control system,
  an automotive media control system or computer,
  a printer, copier or fax machine or all-in-one device,
  a Point Of Sale POS device,
  a cash-register,
  a media player,
  a television,
  a media recorder,
  a Digital Video Recorder (DVR),
  a digital camera,
  a cellular handset,
  a cordless telephone handset, and
  an electronic game.

EC40) The system of EC19, further comprising a means for interfacing with the flash memories.

EC41) The system of EC40, wherein the means for interfacing with the flash memories comprises a flash memory interface.

EC42) The system of EC41, wherein the flash memory interface is compatible with one or more of
an Open NAND Flash Interface (ONFI),
a Toggle-mode interface,
a Double-Data-Rate (DDR) synchronous interface,
a DDR2 synchronous interface;
a synchronous interface, and
an asynchronous interface.

EC43) The system of EC19, further comprising at least one of the flash memories.

EC44) The system of EC43, wherein the at least one flash memory comprises one or more of
NAND flash technology storage cells, and
NOR flash technology storage cells.

EC45) The system of EC43, wherein the at least one flash memory comprises one or more of
Single-Level Cell (SLC) flash technology storage cells, and
Multi-Level Cell (MLC) flash technology storage cells.

EC46) The system of EC43, wherein the at least one flash memory comprises one or more of
polysilicon technology-based charge storage cells, and
silicon nitride technology-based charge storage cells.

EC47) The system of EC43, wherein the at least one flash memory comprises one or more of
two-dimensional technology-based flash memory technology, and
three-dimensional technology-based flash memory technology.

EC48) The system of EC19, further comprising:
a means for interfacing requests from a computing host, the requests relating to information stored in the flash memories; and
a means for interfacing to the flash memories.

EC49) The system of EC48, wherein all of the means are collectively implemented in a single Integrated Circuit (IC).

EC50) The system of EC48, wherein all of the means are comprised in a Solid-State Disk (SSD).

System

FIG. 1A illustrates selected details of an embodiment of SSD 101 including an SSD controller using variable OP for managing non-volatile storage, such as implemented via NVM elements (e.g. flash memories). The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to a type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies Map 141 accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
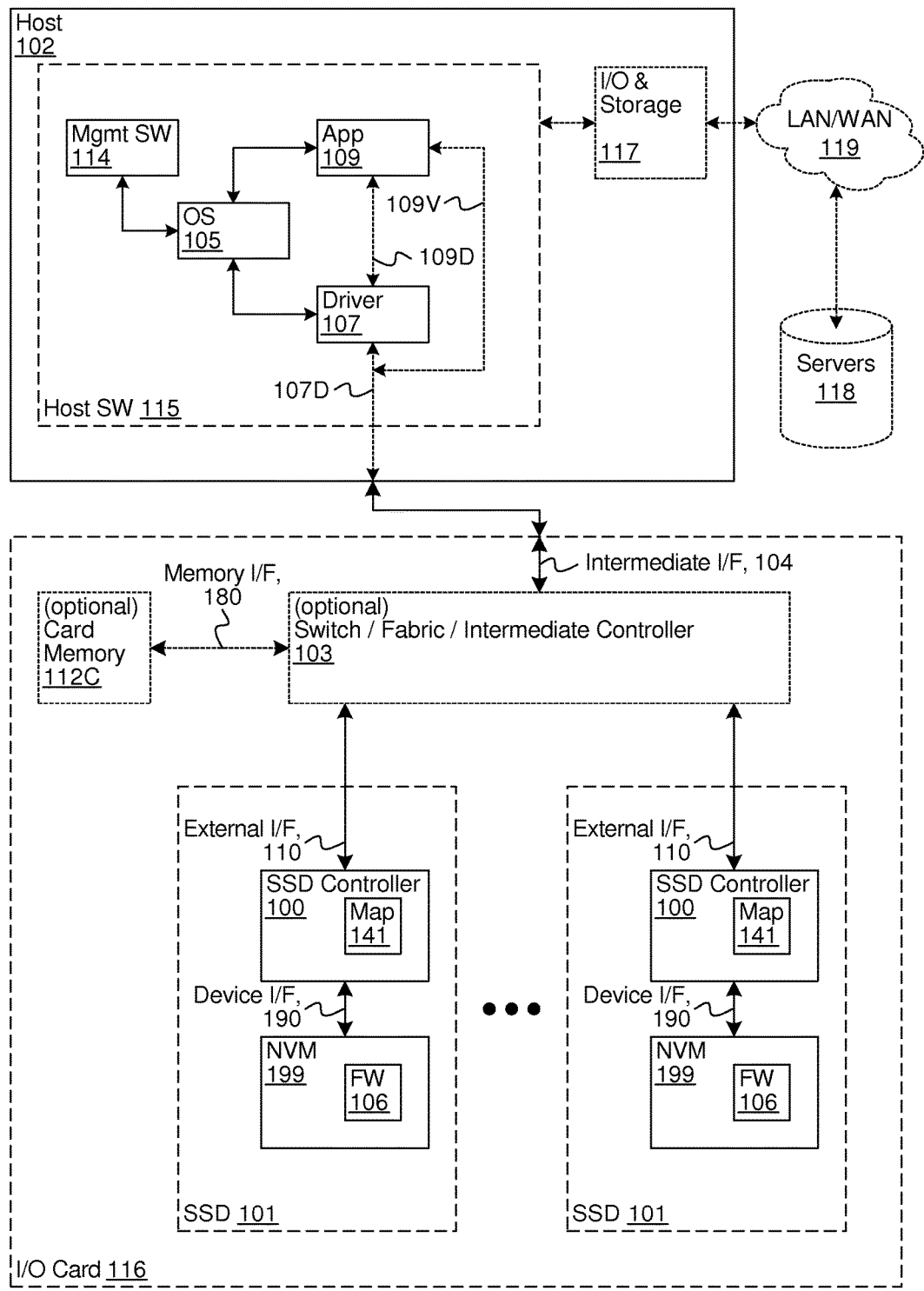
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a Virtual Function (VF).

OS 105 includes and/or is enabled to operate with drivers (illustrated conceptually by Driver 107) for interfacing with the SSD. Various versions of WINDOWS (e.g. 95, 98, ME, NT, XP, 2000, SERVER, VISTA, and 7), various versions of LINUX (e.g. RED HAT, DEBIAN, and UBUNTU), and various versions of MACOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←—→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments where Host 102 is a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a THUNDERBOLT storage component, a UFS storage component, an SD storage component, a MEMORY STICK storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Variable Over-Provisioning (OP)

Figure 2:
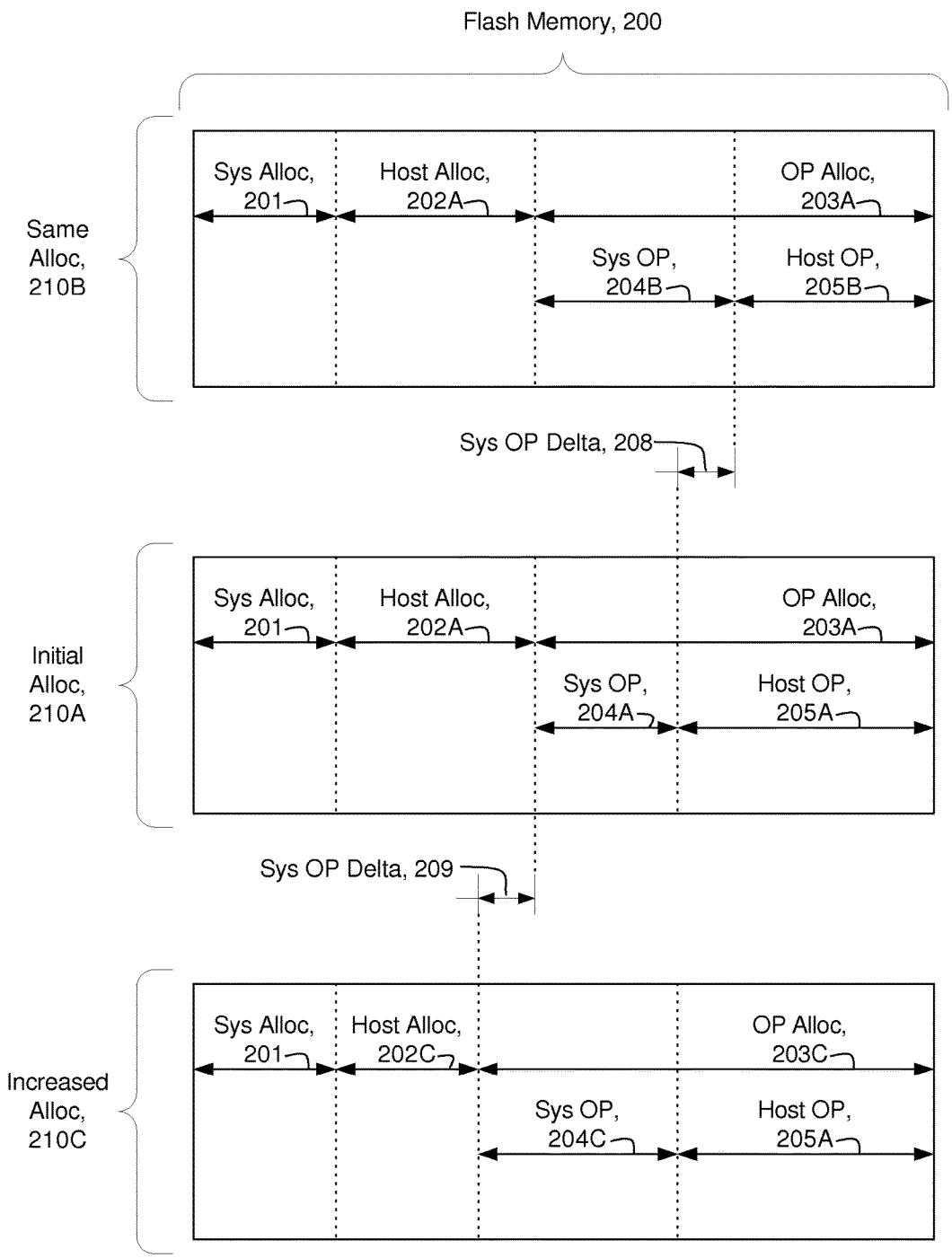
FIG. 2 illustrates selected details of host and system allocations of flash memory, including for OP use, according to various embodiments of a system using variable OP for managing NVMs.

FIG. 2 illustrates selected details of various host and system allocations of Flash Memory 200, including for OP use, according to various embodiments of a system using variable OP for managing NVMs. The host allocation is used to store host data, such as data received/provided from/to a host coupled to an SSD using flash memory for non-volatile storage. A system allocation (e.g. System Allocation 201) is used to store system data, such as relating to management or operation of an SSD controller (e.g. periodic copies of all or portions of information in map 141 of FIG. 1A), an SSD, a flash memory, or any portions thereof.

The figure illustrates Flash Memory 200 used according to three allocation scenarios (Initial, Same, and Increased Allocations 210A, 210B, and 210C, respectively). Each of the allocation scenarios illustrates, at a highest level of detail, three elements to the allocation: host, system, and OP. In Initial Allocation 210A and Same Allocation 210B, the host, system, and OP allocations are illustrated respectively as Host Allocation 202A, System Allocation 201, and OP (system+host) Allocation 203A. In Increased Allocation 210C, the host, system, and OP allocations are illustrated respectively as Host Allocation 202C, System Allocation 201, and OP (system+host) Allocation 203C. At a further level of detail, the various allocations differ according to allocating between host OP allocation and system OP allocation, illustrated as Host OP Allocations 205A and 205B, and System OP Allocations 204A, 204B, and 204C, as described following.

In operation, allocation begins according to a starting state (e.g. Initial Allocation 210A). In response to an event, an agent changes the allocation to a different state (e.g. Same Allocation 210B or Increased Allocation 210C). Various embodiments are according to various operating modes. In a first operating mode, host allocation remains unchanged and OP (system+host) allocation remains unchanged, but is redistributed between system and host OP allocations. In a second operating mode, host allocation is changed to enable corresponding changes to OP (system+host) allocation that is redistributed between system and host OP allocations.

In the first operating mode, after allocation has begun according to Initial Allocation 210A, allocation is then dynamically altered to Same Allocation 210B. At the highest level of detail, the three elements of the allocation remain unchanged. Specifically the host, system, and OP allocations remain unchanged at, respectively, Host Allocation 202A, System Allocation 201, and OP (system+host) Allocation 203A. However, at the further level of detail, the OP allocation is internally altered by decreasing the host OP allocation by an amount and increasing the system OP allocation by the amount. Specifically the host OP allocation decreases from Host OP Allocation 205A to Host OP Allocation 205B by amount System OP Allocation Delta 208, and the system OP allocation increases from System OP Allocation 204A to System OP Allocation 204B by amount System OP Allocation Delta 208.

After further operation, allocation is then dynamically altered to return to Initial Allocation 210A, including the host OP allocation being Host OP Allocation 205A and the system OP allocation being System OP Allocation 204A. Other operating scenarios applicable to the first operating mode include any change in allocation of the OP allocation between host OP and system OP uses (while leaving the host allocation and the system allocation unchanged), without restriction to any of the particular allocations illustrated in the figure.

In the second operating mode, after allocation has begun according to Initial Allocation 210A, allocation is then dynamically altered to Increased Allocation 210C. At the highest level of detail, the three elements of the allocation are altered so that the host allocation is decreased by an amount, and the OP allocation is increased by the amount. At the further level of detail, the host OP allocation remains unchanged and the system OP allocation increases by the amount. Specifically the host allocation decreases from Host Allocation 202A to Host Allocation 202C by amount System OP Allocation Delta 209, and the OP allocation increases from OP Allocation 203A to OP Allocation 203C by amount System OP Allocation Delta 209. At the further level of detail, the host OP allocation remains unchanged at Host OP Allocation 205A, and the system OP allocation increases from System OP Allocation 204A to System OP Allocation 204C by amount System OP Allocation Delta 209.

After further operation, allocation is then dynamically altered to return to Initial Allocation 210A, including the host OP allocation being Host OP Allocation 205A and the system OP allocation being System OP Allocation 204A. Other operating scenarios applicable to the second operating mode include any change in allocation of the OP allocation between host OP and system OP uses (in conjunction with increasing/decreasing the host allocation), without restriction to any of the particular allocations illustrated in the figure.

In a third operating mode (not illustrated), instead of (and/or in addition to) changing the host allocation to accommodate a change in the OP allocation (as in the second operating mode), the system allocation is changed. Thus a decrease/increase in system allocation enables an increase/decrease in system OP allocation, or alternatively a decrease/increase in host allocation in combination with a decrease/increase in system allocation enables an increase/decrease in host and/or system OP allocation. Other operating modes that are any combination of the first through the third operating modes are contemplated, included operating modes that dynamically switch between any of the first through the third operating modes, according to various operating criteria and/or characteristics.

There are several events that lead to an allocation state change and corresponding agents that effect the allocation state change. For example, an SSD controller (e.g. SSD controller 100 of FIG. 1A) determines that an increased (or decreased) amount of flash memory (e.g. NVM 199 of FIG. 1A) is to be used to store host data, such as due to increased (or decreased) usage via changed compression, deduplication, or transformation. In response, the SSD controller increases (or decreases) system OP allocation (e.g. such as from System OP Allocation 204A to System OP Allocation 204C of FIG. 2). For another example, a processor (e.g. CPU 171 of FIG. 1A) within a flash memory based storage sub-system (e.g. SSD 101 of FIG. 1B) receives a command via a storage interface (e.g. external interfaces 110 of FIG. 1B) of the storage sub-system. The command (e.g. an ATA compatible TRIM command) specifies that particular portions of the storage sub-system are unused (e.g. free), and that any data stored therein is no longer needed. In response, the processor decreases allocation of the flash memory to host data and/or host OP and increases allocation of the flash memory to system OP. In various embodiments, the allocation decrease to host data and/or host OP (and optionally and/or selectively an increase to system OP) is postponed until the unused portions have been garbage collected, recycled, and/or erased.

For yet another example, a monitoring sub-system within an SSD controller (e.g. all or any portions of scheduling 193 of FIG. 1A) determines a current ratio of bandwidths of system writes to host writes has changed with respect to a previous ratio. In response, the monitoring sub-system requests that an allocation agent (e.g. all or any portions of recycler 151 of FIG. 1A) of the SSD controller alter allocation between system OP and host OP in accordance with the current ratio. E.g. if the current ratio has increased (decreased), then the allocation agent is requested to increase (decrease) the system OP and/or to decrease (increase) the host OP. In various embodiments the increase (decrease) is a linear function of the current ratio, a linear function of a ratio of the current and the previous ratios, an inverse function of the current ratio, an inverse function of the current and the previous ratios, a non-linear function of the current ratio and/or the ratio of the current and the previous ratios, any combination thereof, or any approximation(s) thereof.

Dynamically Variable Over-Provisioning (Op) and Data Entropy

Figure 3A:
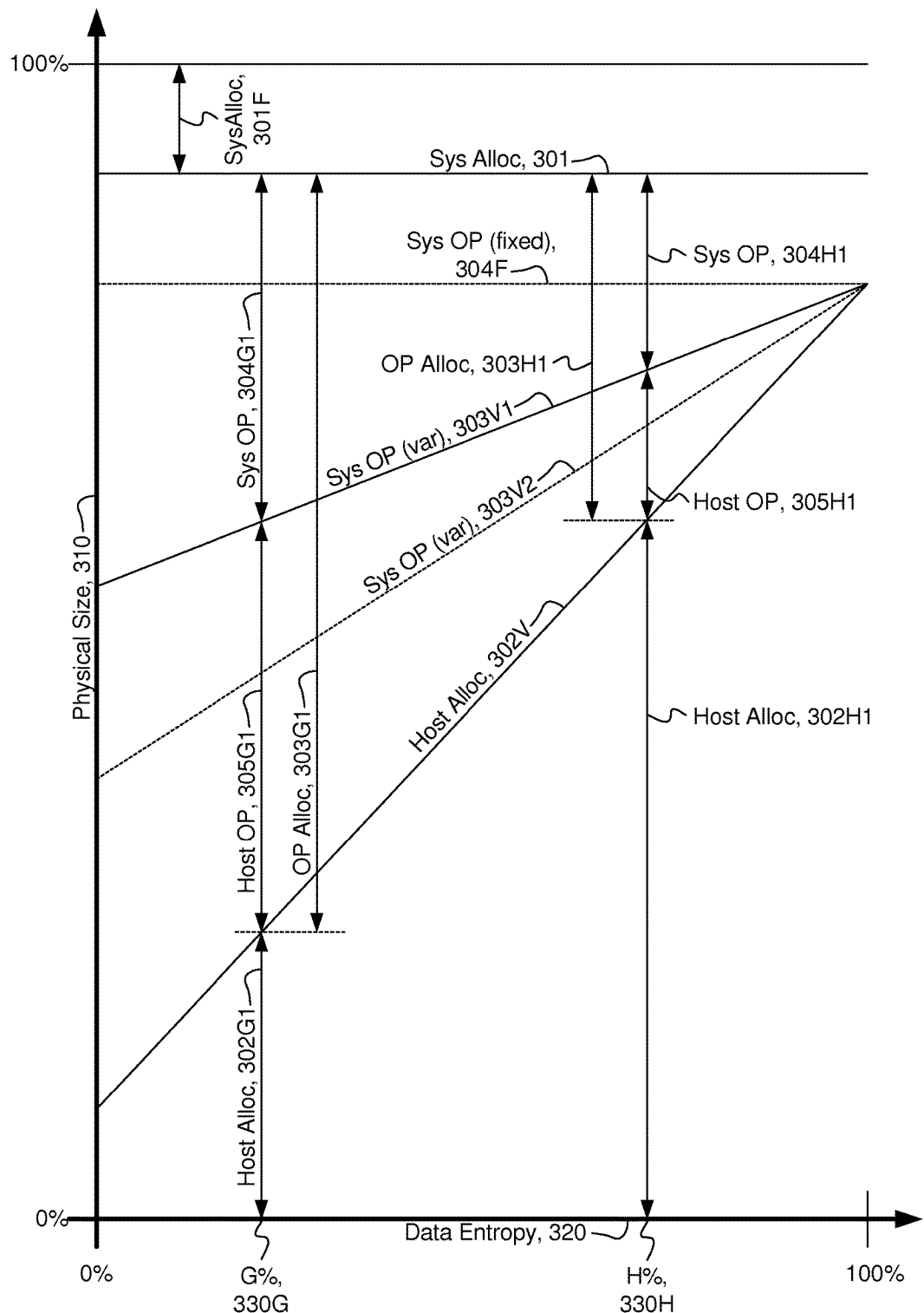
FIG. 3A and FIG. 3B illustrate selected details of various embodiments of dynamically varying host and system OPs as relating to dynamically varying data entropy.
Figure 3B:
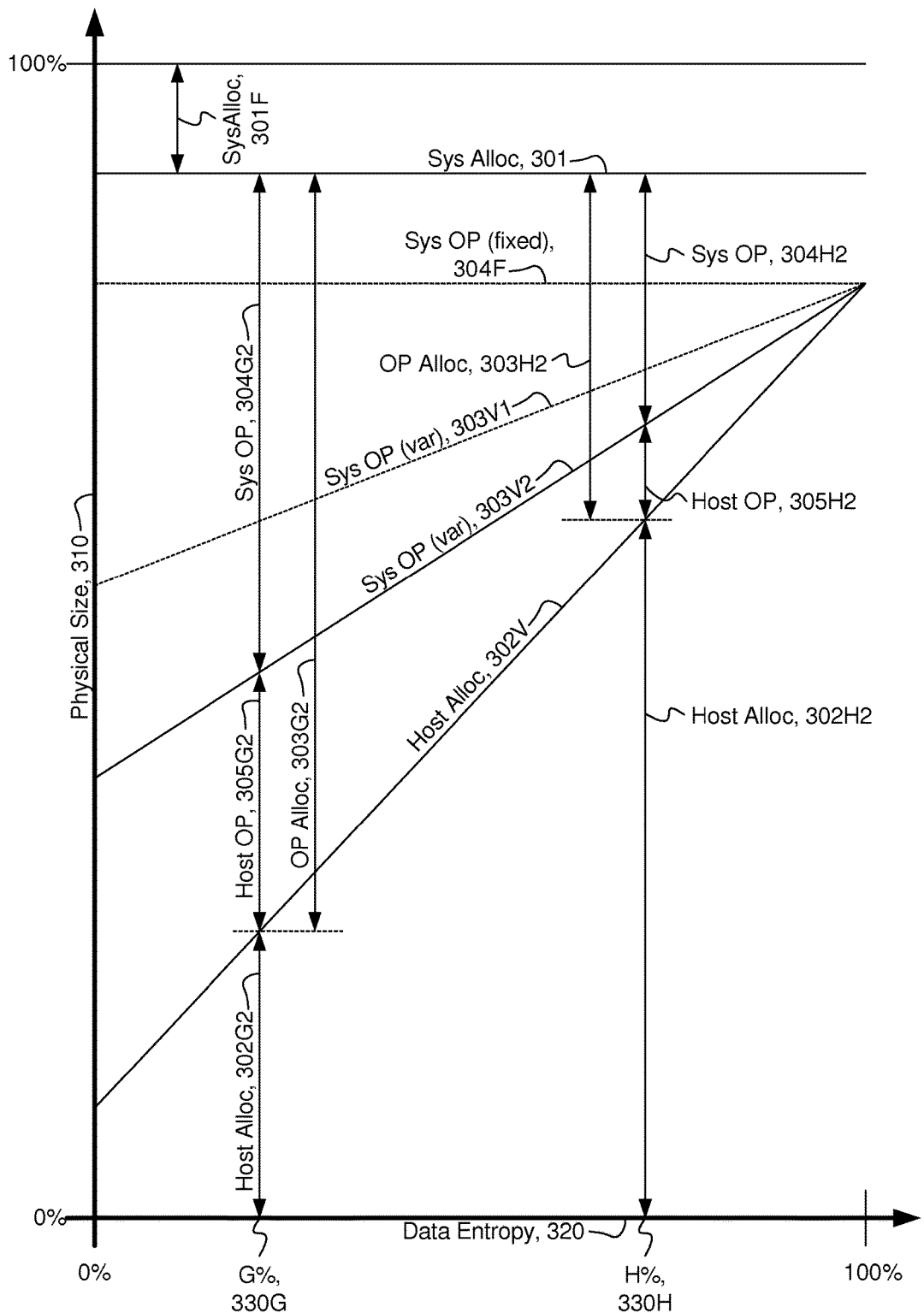

FIG. 3A and FIG. 3B illustrate selected details of various embodiments of dynamically varying host and system OPs as relating to dynamically varying data entropy. The host OP and system OP dynamically vary as one or more host-allocation functions of (dynamically varying) host allocation as well as one or more data-rate-allocation functions of (dynamically varying) data rates (e.g. of host data and system data). The host allocation variation is illustrated as linear with respect to data entropy, for convenience of explanation.

For instance, if host allocation decreases/increases by an amount, then the amount is allocated to/from combined OP, and a resultant combined OP is dynamically allocated between host OP and system OP according to one or more data-rate-allocation functions of one or more data rates. Examples of the data-rate-allocation functions are a linear function, an inverse function, a non-linear function, or any combinations thereof. Examples of the data rates are a host data rate, a system data rate, bandwidth of host data writes to flash memory, bandwidth of system data writes to flash memory, bandwidth of total writes to flash memory, or any combinations thereof.

As illustrated in FIG. 3A and FIG. 3B, a (combined) OP allocation dynamically varies due to a corresponding host allocation dynamic variation. The dynamically varying (combined) OP allocation is then dynamically variably allocated between system OP and host OP, e.g., according to a ratio of bandwidth of system data writes to flash memory and bandwidth of host data writes to flash memory. Therefore, for a particular fractional decrease/increase of host allocation (and at a same ratio), a system OP allocation increases/decreases in accordance with the particular fraction. In various embodiments, the ratio is optionally scaled and/or an offset is included in the allocation between host OP and system OP. In some embodiments, the allocations are further in accordance with one or more of respective minimum/maximum values and/or respective allocation quanta.

Common to both figures, the horizontal axis represents Data Entropy 320, increasing left (0%) to right (100%). Lower data entropy corresponds to host data that is, e.g., relatively highly compressible, relatively highly compactable via deduplication, and/or relatively less random. Higher data entropy corresponds to host data that is, e.g. relatively highly incompressible, relatively lowly duplicative (and thus not highly compactable via deduplication), and/or relatively more random. Two particular data entropy values are illustrated as G % 330G and H % 330H.

In various embodiments, data entropy is conceptual, e.g. no explicit measurements of data entropy are made. Instead, data entropy is a representation of how host data size varies with varying compression, deduplication, or other transformations that alter amount of flash memory used to store host data. For example, flash memory used to store host data increases (decreases) as data entropy increases (decreases). For instance, when illustrating a relationship between data entropy and host data size (e.g. as a host data allocation), a scale for data entropy is interpreted as linear, logarithmic, square-law, arbitrarily variable, or any combinations thereof.

The vertical axis represents Physical Size 310, increasing from bottom (0%) to top (100%). Length along the vertical axis corresponds to flash memory used and/or allocated to be used; e.g. a shorter/longer length corresponds to less/more flash memory used to store a given type of information (e.g. host data or system data). In some embodiments, a particular length corresponds to a number of units of flash memory allocated to a particular usage (e.g. to host data, system data, or OP).

A host allocation function that varies with respect to data entropy is illustrated as Host Allocation 302V. As data entropy increases, physical size of flash memory used to store corresponding host data (e.g. linearly) increases, and vice-versa. An invariant system allocation function that remains fixed as data entropy increases (decreases) is illustrated as System Allocation 301. Embodiments (not illustrated) are contemplated where system allocation varies according to data entropy, such as increasing (decreasing) as data entropy (or any one or more metrics associated with system data size and/or host data size) increases (decreases).

FIG. 3A exemplifies two "operating points" (one corresponding to G % 330G and another to H % 330H) of a first dynamically varying allocation of System OP Allocation (variable) 303V1 corresponding to a linear function of a first value of a ratio. FIG. 3B exemplifies two "operating points" (one corresponding to G % 330G and another to H % 330H) of a second dynamically varying allocation of System OP Allocation (variable) 303V2 corresponding to a linear function of a second value of the ratio. For comparison, FIG. 3A includes a dashed-line of System OP Allocation (variable) 303V2 (having two operating points detailed in FIG. 3B), and FIG. 3B includes a dashed-line of System OP Allocation (variable) 303V1 (having two operating points detailed in FIG. 3A).

In various embodiments, the ratio is a ratio of a system rate to a host rate. In various embodiments, the system and/or the host rate is a function of a current and/or previous data rate and/or write bandwidth. For example, the ratio is system write data bandwidth averaged over a time interval divided by host write data bandwidth averaged over the time interval. For another example, the ratio is system data rate at a previous point in time divided by host data rate at the previous point in time.

In FIG. 3A, the first operating point (corresponding to G % 330G) is with respect to an intersection of G % data entropy with Host Allocation 302V and System OP Allocation (variable) 303V1. The first operating point includes Host Allocation 302G1 and (combined) OP Allocation 303G1 allocated between Host OP Allocation 305G1 and System OP Allocation 304G1. The second operating point (corresponding to H % 330H) is with respect to an intersection of H % data entropy with Host Allocation 302V and System OP Allocation (variable) 303V1. The second operating point includes Host Allocation 302H1 and (combined) OP Allocation 303H1 allocated between Host OP Allocation 305H1 and System OP Allocation 304H1.

Comparing the first and the second operating points, as data entropy increases from G % to H %, flash memory used to store host data increases from Host Allocation 302G1 to Host Allocation 302H1. As less flash memory is then available for OP usage, in response (combined) OP allocation decreases from (combined) OP Allocation 303G1 to (combined) OP Allocation 303H1, and corresponding allocations of host OP and system OP are decreased. Specifically, Host OP Allocation 305G1 is decreased to Host OP Allocation 305H1, and System OP Allocation 304G1 is decreased to System OP Allocation 304H1. The decreases to host OP and system OP allocation are in accordance with an allocation of OP resources between host OP and system OP in accordance with a first value of a ratio, such as a ratio of system write bandwidth to host data bandwidth. The allocation is conceptually represented by System OP Allocation (variable) 303V1, illustrated as a linear function of Host Allocation 302V.

FIG. 3B illustrates techniques similar to techniques illustrated by FIG. 3A. The first and second operating points are with respect to respective intersections of G % and H % data entropies with Host Allocation 302V and System OP Allocation (variable) 303V2. The first operating point includes Host Allocation 302G2 and (combined) OP Allocation 303G2 allocated between Host OP Allocation 305G2 and System OP Allocation 304G2. The second operating point includes Host Allocation 302H2 and (combined) OP Allocation 303H2 allocated between Host OP Allocation 305H2 and System OP Allocation 304H2.

Similar to FIG. 3A, as illustrated in FIG. 3B, an increase in data entropy (e.g. from G % to H %) results in an increase in host allocation (e.g. from Host Allocation 302G2 to Host Allocation 302H2), in turn resulting in a decrease to (combined) OP allocation (e.g. from (combined) OP Allocation 303G2 to (combined) OP Allocation 303H2) that is then reallocated between system OP allocations (e.g. from System OP Allocation 304G2 to System OP Allocation 304H2) and host OP allocations (e.g. from Host OP Allocation 305G2 to Host OP Allocation 305H2). The decreases to system OP and host OP allocation are in accordance with an allocation of OP resources between system OP and host OP in accordance with the second value of the ratio associated with FIG. 3A.

Comparing FIG. 3A to FIG. 3B, the slope of System OP Allocation (variable) 303V1 is less than that of System OP Allocation (variable) 303V2, corresponding to the first value of the ratio being less than the second value of the ratio. Consider embodiments where the ratio is a system data rate divided by a host data rate. In a usage scenario where the system data rate dynamically varies, while the host data rate is unchanging, System OP Allocation (variable) 303V1 corresponds to a lower system data rate than System OP Allocation (variable) 303V2. Thus as the system data rate dynamically increases (with respect to a constant host data rate), the system OP allocation increases from System OP Allocation 304G1 to System OP Allocation 304G2 (or alternatively from System OP Allocation 304H1 to System OP Allocation 304H2). Correspondingly, the host OP allocation decreases from Host OP Allocation 305G1 to Host OP Allocation 305G2 (or alternatively from Host OP Allocation 305H1 to Host OP Allocation 305H2). Alternatively, in a usage scenario where the host data rate dynamically varies, while the system data rate is unchanging, the foregoing system and host OP allocation changes likewise occur (System OP Allocation (variable) 303V1 corresponds to a higher host data rate than System OP Allocation (variable) 303V2).

The first and the second operating points (of FIG. 3A and FIG. 3B), as well as the foregoing description of data entropy increasing from G % to H %, are examples only. For another example, in some usage scenarios, data entropy decreases from H % to G %, and flash memory allocation is altered from being in accordance with the second operating point (H %) to being in accordance with the first operating point (G %), such that an allocation of flash memory to system OP usage increases. Further, a multiplicity of possible operating points along the data entropy axis are possible (not illustrated), limited only by implementation details. Still further, in some circumstances, operational scenarios dynamically switch among various operational scenarios and corresponding operating points dynamically, based, e.g., on various operating characteristics of an SSD and/or an SSD controller.

For comparison and reference, FIGS. 3A and 3B identically illustrate System Allocation (fixed) 301F that is fixed (e.g. invariant with respect to data entropy). Some embodiments and/or usage scenarios include an operating mode and/or operating sub-mode, where system OP resources are fixed (e.g. invariant with respect to data entropy), as illustrated conceptually by System OP Allocation (fixed) 304F. In some embodiments, System OP Allocation (fixed) 304F is representative of all or a portion of a minimum system OP allocation.

FIG. 3A and FIG. 3B illustrate aspects of several examples of dynamically varying system OP (e.g. via dynamic allocation of OP resources between host OP and system OP) as a result of dynamic variance of host allocation, that is in turn affected by dynamic variance in data entropy. Some of the aspects are conceptually represented with respect to either of the figures alone, and some of the aspects are conceptually represented with both figures in combination.

With respect to FIG. 3A alone (or FIG. 3B alone), the dynamically varying system OP is conceptually represented with respect to dynamic changes between various host allocations (corresponding to various data entropy operating points), while a ratio of system data rate to host data rate remains fixed. Consider beginning operating at a host allocation corresponding to G % entropy, such as the intersection with Host Allocation 302V and a system OP allocation function represented by System OP Allocation (variable) 303V1. Then continue by transitioning to operating at a host allocation corresponding to H % entropy, while continuing to allocate and/or allocate system OP resources according to the function represented by System OP Allocation (variable) 303V1. Then continue by transitioning back to operating at the host allocation corresponding to G % entropy, while continuing to allocate and/or allocate system OP resources according to the function represented by System OP Allocation (variable) 303V1. The system OP is dynamically varied from System OP Allocation 304G1 to System OP Allocation 304H1 and then back to System OP Allocation 304G1, in response to changes in host allocation that are in turn related to changes in data entropy operating points.

With respect to FIG. 3A in combination with FIG. 3B, the dynamically varying system OP is conceptually represented with respect to dynamic changes between allocation of OP resources between host OP and system OP uses based on differences and/or changes in system and/or host data rates and/or write bandwidths, one or more functions used to determine the allocation, or any combination thereof. Consider beginning operating at a context as illustrated in FIG. 3A of G % data entropy and System OP Allocation (variable) 303V1. Then continue by transitioning to operating at a context as illustrated by FIG. 3B of G % data entropy and System OP Allocation (variable) 303V2. Then continue by transitioning back to operating at the context as illustrated FIG. 3A of G % data entropy and System OP Allocation (variable) 303V1. The system OP is dynamically varied from System OP Allocation 304G1 to System OP Allocation 304G2 and then back to System OP Allocation 304G1, in response to changes in, e.g., system data write bandwidth, host data write bandwidth, and/or ratio(s) thereof.

With respect to FIG. 3A in combination with FIG. 3B, the dynamically varying system OP is also conceptually represented with respect to dynamic changes between various host allocations (corresponding to various data entropy operating points) in combination with dynamic changes between allocation of OP resources between host OP and system OP uses based on differences and/or changes in system and/or host data rates and/or write bandwidths and/or ratios thereof. Consider beginning operating at a context as illustrated in FIG. 3A of G % data entropy and System OP Allocation (variable) 303V1. Then continue by transitioning to operating at a context as illustrated by FIG. 3B of H % data entropy and System OP Allocation (variable) 303V2. Then continue by transitioning back to operating at the context as illustrated FIG. 3A of G % data entropy and System OP Allocation (variable) 303V1. The system OP is dynamically varied from System OP Allocation 304G1 to System OP Allocation 304H2 and then back to System OP Allocation 304G1, in response to changes in, e.g., host allocation (e.g. related to data entropy), system data write bandwidth, host data write bandwidth, and/or ratios thereof.

Other embodiments are contemplated where allocation of OP resources between host OP and system OP uses is based on data patterns as received from a host. For example, if a host is performing a series of writes to sequential addresses, then an allocation between host and system OP uses is computed using a reduced host data rate that is a fraction (less than unity) of a measured host data rate, so that less host data OP is allocated than if the measured host data rate were used for the allocation. For another example, if a host is performing a series of writes to random addresses, then allocation between host and system OP uses is computed using an increased system data rate that is a multiple of a measured system data rate, so that more system data OP is allocated than if the measured system data rate were used for the allocation. The multiple is greater than unity, but not necessarily an integer.

Other embodiments are contemplated where allocation of OP resources between host OP and system OP uses is based on instantaneous usage of units of flash memory. For example, if a burst of units are used to store system (or alternatively host) data, then an allocation of system (or alternatively host) OP is temporarily boosted.

Some aspects of some embodiments represented by FIG. 3A and FIG. 3B (as well as FIG. 2) are illustrated conceptually. In the aforementioned figures, the various allocations are representative of respective total amounts of storage of a flash memory allocated, whether contiguous or not. For example, System Allocation 201 is a plurality of non-contiguous units of the Flash Memory. For another example, Host Allocation 302G1 and (combined) OP Allocation 303G1 are each respective pluralities of non-contiguous units of the Flash Memory.

In some embodiments (such as illustrated in part by FIGS. 2, 3A, and/or 3B), additional flash memory (not illustrated) is available as a resource for increasing OP, or alternatively failure of one or more portions of the flash memory results in decreasing OP. In some embodiments, flash memory is held aside for uses not illustrated. For example, one or more portions of one or more flash die of a flash memory are reserved for replacement of failed portions of the flash memory.

In some embodiments (such as illustrated in part by FIGS. 2, 3A, and/or 3B), all or any portions of the host data and/or the system data are stored in a flash memory unaltered, compressed, deduplicated, encrypted, subject to any form of reversible transformation, or any combination thereof. In some embodiments, information stored in the flash memory includes, in some embodiments, lower-level redundancy information (e.g. per-page ECC) and/or higher-level redundancy information (e.g. RAID-like redundancy information), in addition to information protected by the lower-level and/or higher-level redundancy information.

Over-Provisioning (OP) Resource Unit (Re)Allocation and Life Cycle

Figure 4:
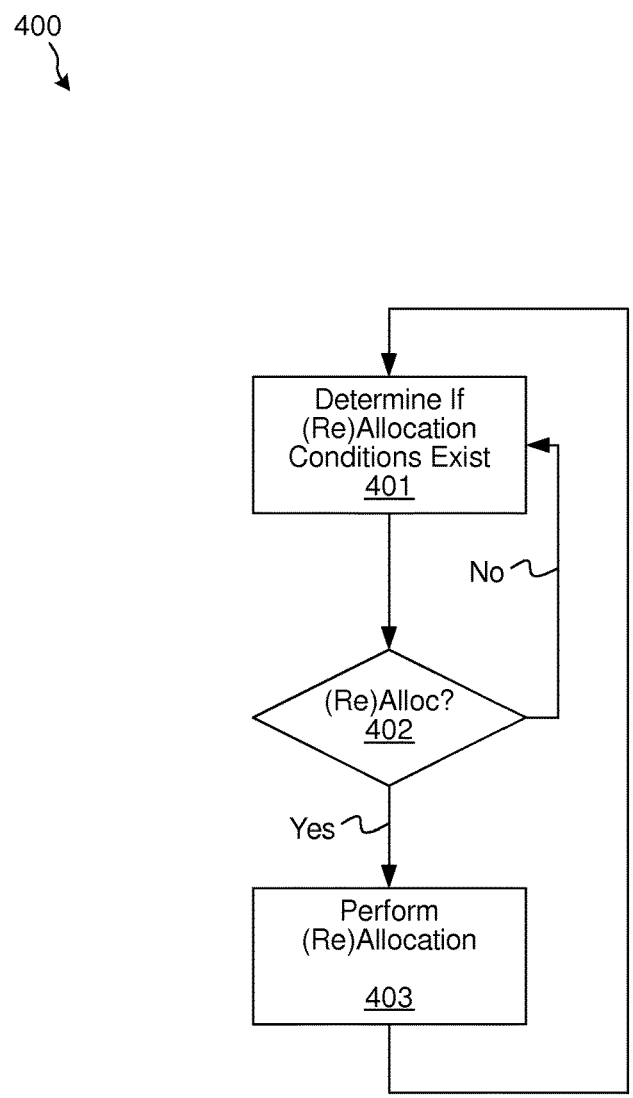
FIG. 4 illustrates a flow diagram of an embodiment of (re)allocation of OP resources in a context of variable OP for managing NVMs.

FIG. 4 illustrates Flow Diagram 400 of an embodiment of allocation and/or (re)allocation of OP resources in a context of variable OP for managing NVMs, such as in one or more contexts relating to any of FIGS. 2, 3A, and 3B. Flow begins by computing if circumstances correspond to performing a reallocation (Determine If (Re)Allocation Conditions Exist 401 followed by (Re)Allocate? 402). If the circumstances are not present, then flow loops back to repeat the computing. If the circumstances are present, then a (re)allocation is requested, queued, or immediately executed, according to various embodiments (Perform (Re)Allocation 403).

In various embodiments, a computation of whether allocation and/or (re)allocation conditions exist (e.g. Determine If (Re)Allocation Conditions Exist 401 and/or (Re)Allocate? 402) are performed at any one or more of various particular points in time. Examples of the various particular points in time are when one or more flash memory units are allocated or marked as for a particular use (e.g., as being for system OP or host OP use). Other examples are when the units exit, enter, or are picked for various operations such as garbage collection, recycling, or erasing. Other examples are when the units enter a host unit management state, a system unit management state, or a free queue, or when the units transition from one management state to another. Other examples are when a number of the units available for a particular use (e.g. for system use or host use) reach respective predetermined and/or programmatically determined thresholds (e.g. high or low watermarks).

In various embodiments conceptually represented by any one or more of FIGS. 2, 3A, 3B, and 4, a computation of whether allocation and/or (re)allocation conditions exist (e.g. Determine If (Re)Allocation Conditions Exist 401) is implemented as a unit is marked as being for a particular usage (e.g. host or system).

In various embodiments conceptually represented by any one or more of FIGS. 2, 3A, 3B, and 4, an allocation change, e.g. an allocation and/or a (re)allocation, is implemented as a target when marking unused and/or empty units of the flash memory for a particular use, e.g. marking a flash memory unit exiting garbage collection as being for host OP use versus system OP use, or marking a flash memory unit at a time of entry into a free queue as being for host OP use versus system OP use. For example, in some embodiments represented by FIG. 4, the performing of reallocation is a multi-stage process. A target (re)allocation is determined and stored, and then as flash memory units exit garbage collection, the exiting units are marked as usable in accordance with the stored (re)allocation.

Figure 5:
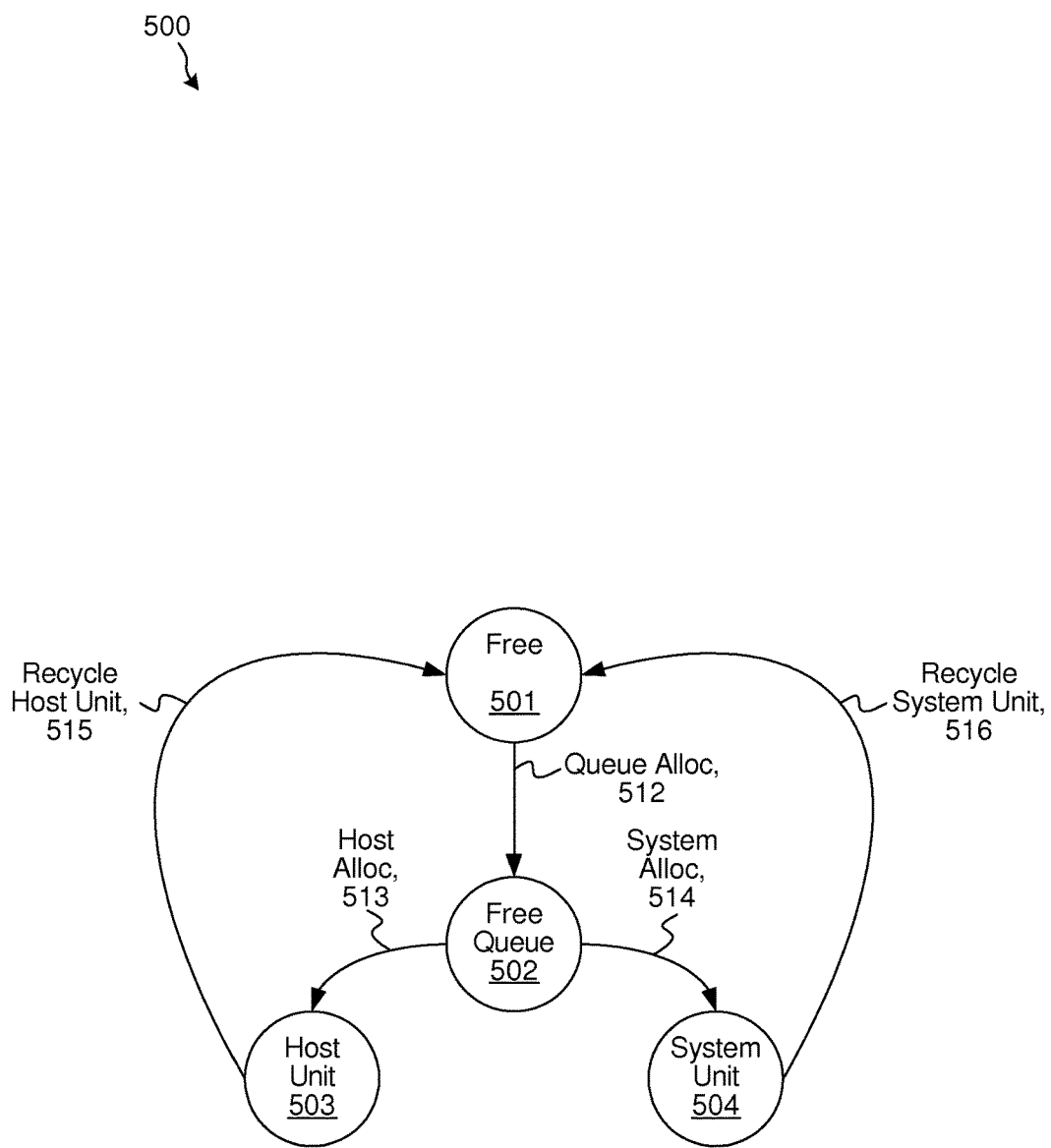
FIG. 5 illustrates a flow diagram of an embodiment of a life-cycle of a managed unit of flash memory.

FIG. 5 illustrates Flow Diagram 500 of an embodiment of a life-cycle of a managed unit of flash memory, such as an R-block. All or any portions of the flash memory are managed as a collection of units, and the flow diagram is representative of how a flash unit management agent manages a state of each of the units. Conceptually Flow Diagram 500 is representative of a state machine that is instantiated for each of the units that are managed. For brevity in the following description, terminology such as "setting" a unit to a particular state or "marking" a unit as being in a particular state is shorthand for setting a management state associated with the unit to the particular state (or to one or more values indicative of the particular state).

Continuing with the description, at initialization (e.g. in response to power-on reset, reception of a reset command, or any combination thereof) all of the units of the flash memory are set to an initial state indicating the units are available for use (Free 501). In response to a request to prepare a unit for eventual allocation, the unit is prepared for allocation (e.g. at least in part via garbage collection, recycling, and/or erasing) and is set to indicate availability for immediate allocation (Free Queue 502). In some embodiments, availability for immediate allocation corresponds to the unit being in one of one or more free queues, as conceptually indicated by an allocation transition marking (Queue Allocation 512).

Once in the one of the free queues, a unit is marked according to usage as host usage (Host Allocation 513) or as system usage (System Allocation 514). The unit is then used in accordance with the marking for host usage (Host Unit 503) or for system usage (System Unit 504). In response to choosing a particular unit for reclamation via recycling or garbage collection, the particular unit is reclaimed and is set to indicate that the particular unit is available for use (Free 501). The setting to indicate availability occurs whether the unit was being used for host usage (Recycle Host Unit 515) before being chosen for reclamation, or whether the unit was being used for system usage (Recycle System Unit 516) before being chosen for reclamation.

In some embodiments, choosing a unit for reclamation is conceptually a two-stage process. First, a selection of a type of unit to reclaim, such as a unit being used to store host data (corresponding, e.g., to Host Unit 503) or a unit being used to store system data (corresponding, e.g., to System Unit 504) is made. The selection is based on (dynamically) variable OP, such as described with respect to FIG. 2, 3A, or 3B. Second, within at least a portion of the units of the selected category, a selection for the unit to reclaim is made.

In some alternate embodiments, there are no free queues, and a unit is marked as transitioning immediately from being available for use (Free 501) to being used according to usage as a host unit (Host Unit 503) or as a system unit (System Unit 504) without passage through an intermediate queuing state (Free Queue 502). In some alternate embodiments, there are two categories of queues according to units to be used as host units or system units, and a decision about whether a unit is to be used as a host unit or as a system unit is made when the unit is marked as transitioning immediately from being available for use (Free 501) to being available for immediate allocation according to a queue having the host categorization or the system categorization.

In various embodiments and/or usage scenarios, various operations related to any one or more of FIGS. 2, 3A, 3B, and 4 are performed in response to and/or in coordination with various transitions illustrated in FIG. 5 (or alternate embodiments described in relation to FIG. 5). The various operations include the (dynamic) allocation(s), (dynamic) reallocation(s), as well as computations and determinations relating to the allocations/reallocations.

For example, dynamically altering host allocation, such as illustrated between Host Allocation 202A and Host Allocation 202C of FIG. 2, is performed when a unit is marked as exiting the one of the free queues to be used as a host unit (Host Allocation 513 of FIG. 5). For another example, dynamically altering allocation of OP resources between host OP allocation and system OP allocation, such as illustrated between System OP Allocation 204A and System OP Allocation 204B of FIG. 2, is performed when a unit is marked as entering a free queue having a system categorization. For yet another example, dynamically altering allocation of OP resources between host OP allocation and system OP allocation, such as illustrated between System OP Allocation 304G1 of FIG. 3A and System OP Allocation 304G2 of FIG. 3B, is performed as a unit is marked as being for host use (Host Unit 503) or system use (System Unit 504) upon exiting the one of the free queues.

For yet another example, computing whether or not to reallocate (e.g. Determine If (Re)Allocation Conditions Exist 401 and/or (Re)Allocate? 402 of FIG. 4), is performed in coordination with a request that a unit be selected for reclamation and recycled (e.g. Recycle Host Unit 515 or Recycle System Unit 516). In some embodiments, a categorization of a unit selected for reclamation is independent of a result of a (re)allocation (e.g. Perform (Re)Allocation 403), such as a host unit or a system unit being selected irrespective of a result of a reallocation. In other embodiments, a categorization of a unit selected for reclamation is based at least in part on a result of a (re)allocation (e.g. Perform (Re)Allocation 403), such as a host unit being selected when a reallocation result indicates that fewer host units are to be allocated to host OP usage.

In various embodiments, one or more elements of FIGS. 2, 3A, 3B, and 4 correspond to or are related to one or more elements of FIG. 1A. For example, Flash Memory 200 of FIG. 2 corresponds to NVM 199. For another example, length along Physical Size 310 of FIG. 3A and FIG. 3B corresponds to amount of storage of NVM 199. For yet another example, one or more of the allocation operations or allocation-related operations described with respect to FIGS. 2, 3A, 3B, and/or 4 are performed by, or under control of, one or more portions of one or more of recycler 151 and CPU 171. For yet another example, one or more of the state transitions of FIG. 5 are performed by, or under control of, one or more portions of one or more of map 141, recycler 151, and CPU 171. For yet another example, measurement of host data rate(s), such as referred to with respect to FIG. 2, 3A, or 3B, is performed via all or any portion(s) of host interface 111. For yet another example, measurement of host and/or system data rate(s), such as referred to with respect to FIG. 2, 3A, or 3B, is performed via all or any portion(s) of device interface logic 191 and/or scheduling 193.

Example Implementation Techniques

In some embodiments, various combinations of all or portions of operations performed by a system implementing variable OP for managing non-volatile storage, e.g. with flash memories, a computing-host flash memory controller, and/or an SSD controller (such as SSD controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: VERILOG, VHDL (Very high speed integrated circuits Hardware Description Language), SPICE, SPICE variants such as PSPICE, *IBIS* (I/O Buffer Information Specification), LEF (Library Exchange Format), DEF (Design Exchange Format), GDS-II (Graphic Data System), OASIS (Open Artwork System Interchange Standard), or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of any patent issued based on this application. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of any patent issued based on this application.

What is claimed is:

1. A device comprising:
   nonvolatile solid state data storage memory;
   a controller coupled to the nonvolatile solid state data storage memory, the controller configured to:
   dynamically implement a first state of the nonvolatile solid state data storage memory by:
   allocating a first portion of the nonvolatile solid state data storage memory for system data including data for management of the nonvolatile solid state data storage memory by the controller;
   allocating a second portion of the nonvolatile solid state data storage memory for host data;
   allocating a third portion of the nonvolatile solid state data storage memory for overprovisioning reserved for the first portion;
   allocating a fourth portion of the nonvolatile solid state data storage memory for overprovisioning reserved for the second portion;
   dynamically implement a second state of the nonvolatile solid state data storage memory in response to a first event, implementing the second state includes:
   keeping a same amount of data storage space allocated for the first portion;
   decreasing a first amount of data storage space allocated for the second portion;
   increasing a second amount of data storage space allocated for a total data storage space of the third portion plus the fourth portion;
   dynamically allocate the total data storage space of the third portion plus the fourth portion based on one or more data-rate-allocation functions of one or more data rates; and
   delay implementation of the second state until a garbage collection operation is complete.

2. The device of claim 1 further comprising the controller configured to:
   implement a third state of the nonvolatile solid state data storage memory in response to a second event; and
   implement the third state of the nonvolatile solid state data storage memory by:
   keeping a same amount of data storage space allocated for the first portion;
   keeping a same amount of data storage space allocated for the second portion;
   increasing an amount of data storage space allocated for the third portion; and
   decreasing an amount of data storage space allocated for the fourth portion.

3. The device of claim 2 further comprising a total data storage space of the third portion plus the fourth portion in the third state is equal to a total data storage space of the third portion plus the fourth portion in the first state.

4. The device of claim 2 further comprising the controller configured to return a state of the nonvolatile solid state data storage memory to the first state after the nonvolatile solid state data storage memory was in the third state.

5. The device of claim 2 further comprising the controller configured to implement a fourth state of the nonvolatile solid state data storage memory by changing an amount of data storage space allocated for the first portion.

6. The device of claim 1 further comprising the first amount of data storage space and the second amount of data storage space are equal.

7. The device of claim 1 further comprising the controller configured to:
increase an amount of data storage space allocated for the third portion; and
keep a same amount of data storage space allocated for the fourth portion.

8. The device of claim 1 further comprising the controller configured to return a state of the nonvolatile solid state data storage memory to the first state after the nonvolatile solid state data storage memory was in the third state.

9. The device of claim 1 further comprising a monitoring system configured to:
determine that a ratio of bandwidths of system writes to host writes has changed with respect to a previous ratio; and
trigger the first event to change a state of the nonvolatile solid state data storage memory based on the ratio.

10. The device of claim 1 further comprising the controller configured to:
determine when the second portion changes by a determined amount; and
change a combined data storage space of the third portion and the fourth portion by the determined amount.

11. The device of claim 1 further comprising the one or more data rates include at least one of a host data rate, a system data rate, bandwidth of host data writes to the nonvolatile solid state data storage memory, bandwidth of system data writes to the nonvolatile solid state data storage memory, or bandwidth of total writes to the nonvolatile solid state data storage memory.

12. The device of claim 1 further comprising the controller configured to:
determine when the second portion changes by a determined amount;
change a combined data storage space of the third portion and the fourth portion by the determined amount; and
dynamically allocate the combined data storage space between the third portion and the fourth portion based on a ratio of bandwidth of system data writes to the nonvolatile solid state data storage memory and bandwidth of host data writes to the nonvolatile solid state data storage memory.

13. The device of claim 12 further comprising the controller implements an offset in an allocation of the combined data storage space between the third portion and the fourth portion.

14. A memory device including instructions, that when executed by a processing element, cause the processing element to:
implement a first state of a nonvolatile solid state data storage memory by:
allocating a first portion of the nonvolatile solid state data storage memory for system data including data for management of a controller of the nonvolatile solid state data storage memory;
allocating a second portion of the nonvolatile solid state data storage memory for host data;
allocating a third portion of the nonvolatile solid state data storage memory for overprovisioning reserved for the first portion;
allocating a fourth portion of the nonvolatile solid state data storage memory for overprovisioning reserved for the second portion;
implement a second state of the nonvolatile solid state data storage memory in response to a first event, implementing the second state includes:
keeping a same amount of data storage space allocated for the first portion;
decreasing a first amount of data storage space allocated for the second portion;
increasing a second amount of data storage space allocated for a total data storage space of the third portion plus the fourth portion;
dynamically allocate the total data storage space of the third portion plus the fourth portion based on a ratio of bandwidth of system data writes to the nonvolatile solid state data storage memory and bandwidth of host data writes to the nonvolatile solid state data storage memory; and
delay implementation of the second state until a garbage collection operation is complete.

15. The memory device of claim 14, further including instructions, that when executed by the processing element, cause the processing element to:
change the nonvolatile solid state data storage memory from the first state to a third state of the nonvolatile solid state data storage memory by:
keeping a same amount of data storage space allocated for the first portion;
keeping a same amount of data storage space allocated for the second portion;
increasing an amount of data storage space allocated for the third portion; and
decreasing an amount of data storage space allocated for the fourth portion.

16. A device comprising:
a controller configured to manage a nonvolatile solid state data storage memory, the controller further configured to:
implement a first state of the nonvolatile solid state data storage memory by:
allocating a first portion of the nonvolatile solid state data storage memory for system data including data for management of the nonvolatile solid state data storage memory by the controller;
allocating a second portion of the nonvolatile solid state data storage memory for host data;
allocating a third portion of the nonvolatile solid state data storage memory for overprovisioning reserved for the first portion; and
allocating a fourth portion of the nonvolatile solid state data storage memory for overprovisioning reserved for the second portion;
implement a second state of the nonvolatile solid state data storage memory in response to a first event, implementing the second state includes:
keeping a same amount of data storage space allocated for the first portion;
decreasing a first amount of data storage space allocated for the second portion;
increasing a second amount of data storage space allocated for a total data storage space of the third portion plus the fourth portion; and dynamically allocate the total data storage space of the third portion plus the fourth portion based on a ratio of bandwidth of system data writes to the nonvolatile solid state data storage memory and bandwidth of host data writes to the nonvolatile solid state data storage memory.

17. The device of claim 16 further comprising the controller configured to:
return a state of the nonvolatile solid state data storage memory to the first state after the nonvolatile solid state data storage memory was in the second state.

18. The device of claim 17 further comprising the controller configured to:
determine that a ratio of bandwidths of system writes to host writes has changed with respect to a previous ratio; and
trigger the first event to implement the second state based on the ratio.

* * * * *